United States Patent [19]

Nagano

[11] Patent Number: 4,905,537
[45] Date of Patent: Mar. 6, 1990

[54] SPEED-CHANGING DEVICE FOR A BICYCLE

[75] Inventor: Masashi Nagano, Izumi, Japan

[73] Assignee: Shimano Industrial Company Limited, Osaka, Japan

[21] Appl. No.: 576,579

[22] Filed: Feb. 3, 1984

[30] Foreign Application Priority Data

Feb. 12, 1983 [JP] Japan ................................. 58-21907

[51] Int. Cl.[4] .............................................. G05G 5/06
[52] U.S. Cl. ...................................... 74/531; 74/502.2
[58] Field of Search ................... 74/531, 548, 501 R, 74/541, 475, 527, 535, 578, 488, 489; 192/55, 56 L

[56] References Cited

U.S. PATENT DOCUMENTS

| | | | |
|---|---|---|---|
| 2,836,989 | 6/1958 | Schultz | 74/531 X |
| 3,400,605 | 9/1968 | Hood | 74/531 X |
| 3,439,557 | 4/1969 | Bookout | 74/531 |
| 3,915,029 | 10/1975 | Shimada | 74/531 X |
| 3,921,780 | 11/1975 | Gentzlinger et al. | 74/531 X |
| 3,921,955 | 11/1975 | Haddad | 74/531 X |
| 3,945,201 | 3/1976 | Entringer | 74/531 X |
| 4,155,270 | 5/1979 | Juy | 74/475 |
| 4,232,564 | 11/1980 | Yamasaki | 74/531 X |
| 4,351,198 | 9/1982 | Hansen | 74/531 X |
| 4,437,357 | 3/1984 | Ozaki et al. | 74/531 X |
| 4,454,784 | 6/1984 | Shimano | 74/527 |

FOREIGN PATENT DOCUMENTS

| | | | |
|---|---|---|---|
| 3145466 | 6/1982 | Fed. Rep. of Germany | 74/541 |
| 939800 | 1/1947 | France | 74/548 |
| 2494209 | 5/1982 | France . | |

Primary Examiner—Rodney M. Lindsey
Attorney, Agent, or Firm—Stevens, Davis, Miller & Mosher

[57] ABSTRACT

A speed-changing device for a bicycle wherein a boss of an operating lever is rotatably supported to a lever shaft, a holder supported non-rotatably to a fixing member including the lever shaft incorporates a sound-generating mechanism comprising a ridge-groove member having a ridge-groove surface and a sound-generator engageable therewith to generate a sound, thereby forming a sound-generator unit, one of the ridge-groove member and sound-generating of the unit is adapted to engage for associated motion with the boss of the operating lever, so that the operating lever is turned to generate a sound.

12 Claims, 3 Drawing Sheets

SPEED-CHANGING DEVICE FOR A BICYCLE

FIELD OF THE INVENTION

This invention relates to a speed-changing device for a bicycle, and more particularly to a speed-changing device for a bicycle including a sound-generating mechanism which generates a sound upon the turning of a speed-change operating lever supported to a lever shaft.

BACKGROUND OF THE INVENTION

Conventionally, a well-known speed-changing device for a bicycle is constructed so that at one of an operating lever and a fixing member having a lever shaft supporting the operating lever is provided a ridge-groove surface, and the other of the lever and fixing member supports by a coiled spring a sound-generator engageable with the ridge-groove surface. The sound-generator is biased toward the ridge-groove surface by the spring, so that as the operating lever is turned it changes the engagement position of the sound-generator with the ridge-groove surface so as to intermittently generate a sound due to the engagement.

This conventional device has the ridge-groove surface directly on one of the operating lever and the fixing member. The sound-generator is formed separately from the coiled spring, so that upon assembling of the device the sound-generator and coiled spring are supported to one of the operating lever and the fixing member causing the sound-generator to engage with the ridge-groove surface. Hence, it is difficult to assemble or place the sound-generator unidirectionally biased by the coiled spring at a specific position to engage with the ridge-groove surface. It often happens that the sound-generator is moved away from the set position and the sound-generator or coiled spring unexpectedly falls off at the set position, resulting in a poor assembling efficiency or workability. Additionally, when speed-changing devices having respective different constructions are used for supporting operating levers having different constructions at the bosses thereof, the speed-changing devices cannot employ a common sound-generating mechanism comprising the ridge-groove surface and sound-generator biased by the coiled spring, so that each of the speed-changing devices needs its own specific sound-generating mechanism, which increases the costs to produce the various types of devices.

SUMMARY OF THE INVENTION

The invention has been designed to overcome these problems. An object of the invention is to provide a speed-changing device for a bicycle which includes a sound generating mechanism of a ridge-groove member having a ridge-groove surface and a unitary construction which includes a sound-generator engageable with the ridge-groove surface to generate a sound and the ridge-groove member, the unit itself being mountable to the device. Additionally, the sound-generating mechanism is designed to be interchangeable so as to be applied in common to various types of speed-changing devices.

In detail, the speed-changing device of the invention provides a holder supported non-rotatably to a fixing member including a lever shaft, the holder being incorporated with a sound-generating mechanism comprising a ridge-groove member having a ridge-groove surface and a sound-generator engageable therewith to generate a sound, so that the holder and the sound-generating mechanism constitute a sound-generating unit. A speed-change operating lever and the holder of sound-generating unit are supported to the fixing member, and one of the ridge-groove member and sound-generator is adapted to engage for associated motion with the boss of the operating lever, so that the sound-generating unit can be assembled to the device.

According to the present invention, the sound-generating unit itself can be previously readily built without any obstruction by the remaining other components for the device. Additionally, the sound-generating unit can be accurately and ensurely set at an appropriate position; for example, by simply fitting the holder of the unit onto the lever shaft and fitting the boss of the operating lever outside the sound-generating unit so as to cause the boss to engage with the ridge-groove member or the sound-generator. Hence, the invention can facilitate efficiency while reducing manufacturing costs.

Furthermore, the sound-generating unit of the invention can be applied in common to any various types of speed-changing devices each having respective different constructions for supporting the operating lever and respective different constructions at the bosses thereof, but has an accommodation room for example around the lever shaft for accommodating the sound-generating unit and has at the boss of the operating lever an engaging portion engagegeable with one of the ridge-groove member and the sound-generator. Hence, even speed-changing devices of various types can be manufactured at a reduced cost.

Additionally, when intervals between the recesses at the ridge-groove surface of the ridge-groove member are made, for example, smaller, the device can provide a sound quickly sounding at short intervals. When intervals between the recesses at the ridge-groove surface are set to be substantially equal to the movement extent of the operating lever corresponding to its rotational magnitudes between the speed-change stages, while the sound-generator is adapted to engage with one of the recesses, the construction can be employed as a positioning mechanism for the operating lever to stop the operating lever at any position corresponding to any selected speed-change stage.

These and other objects of the invention will become more apparent in the detailed description and examples which follow.

DETAILED DESCRIPTION OF THE INVENTION

The speed-changing device of the invention mainly comprises a fixing member 1 having a lever shaft 2 and an operating lever 3 supported rotatably to the lever shaft 2.

Figure 2:
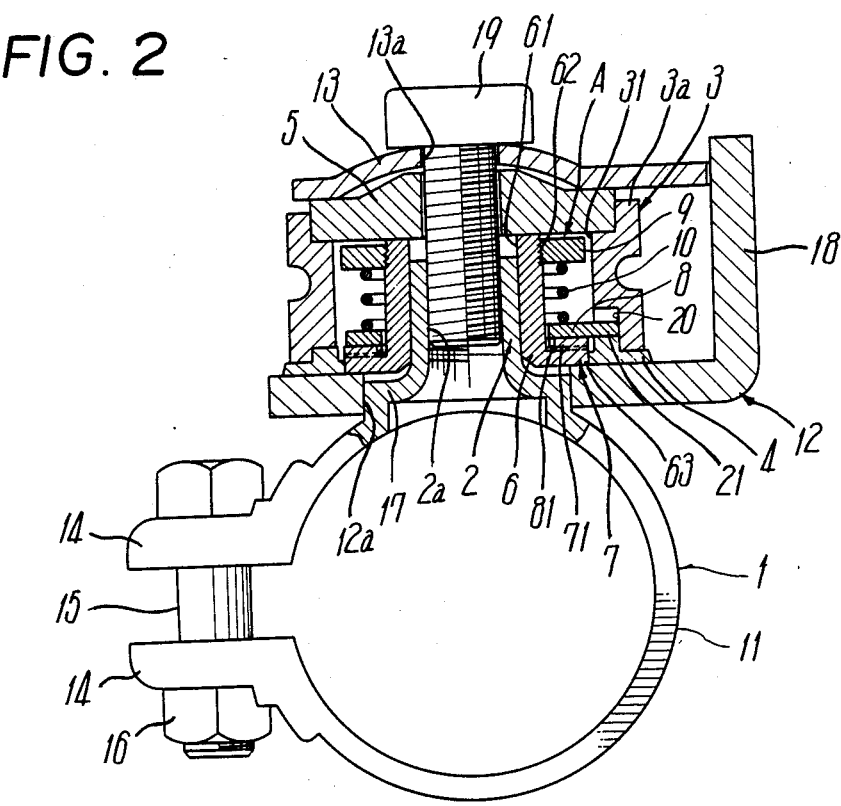
FIG. 2 is a sectional view taken on the line II—II in FIG. 1.

The fixing member 1, as shown in FIG. 2, comprises a tightening band 11 of a substantially C-like shape, a disc-like shaped base plate 12, a disc-shaped lid 13 and the lever shaft 2, the band 11 being provided at both ends thereof with tongues 14 and 14, and a bolt 15 projects therethrough and a nut 16 is tightened to fix the device to the bicycle frame, e.g., a top tube.

The lever shaft 2 projects from the tightening band 11 and has a threaded bore 2a at the center and a square swollen portion 17 at the root, the base plate 12 having a square bore 12a which is fitted onto the swollen portion 17, thereby coupling the base plate 12 with the tightening band 11.

The base plate 12, as shown in FIG. 2, has a rising 18 extending in parallel to the axis of lever shaft 2, so that the lid 13 is fitted at one side thereof onto the rising 18 and a bolt 19 is inserted through the central bore 13a at the lid 13 and screws with the lever shaft 2, thereby fixing the base plate 12 to the band 11.

The lever shaft 2 is integrally formed with the band 11 as shown and it alternatively may be integral with the base plate 12, or separate from the band 11 or base plate 12 and then fixed thereto.

The operating lever 3 comprises a boss 3a and an operating portion 3b, the boss 3a having a central bore 31 which is larger in diameter than and fitted onto the lever shaft 2. The operating lever 3 is mounted on the fixing member 1 in such a manner that the boss 3a at first is rotatably fitted onto the lever shaft 2 through the bore 31 with a washer 4 of synthetic resin being interposed between the operating lever 3, i.e., the boss 3a and the base plate 12, then the lid 13 is placed on the boss 3a through a washer 5 of synthetic resin interposed between the lid 13 and the boss 3a, and the bolt 19, as abovementioned, screws with a threaded bore 2a at the lever shaft 2. Hence, the operating lever 3 is subjected to the predetermined frictional resistance and the lid 13 is mounted not-rotatably to the base plate 12 through the fitting of the tip of rising 18 into one side portion of lid 13.

The rotation of lid 13 may be restrained or prevented by other means.

The invention has a sound-generating unit A which is provided between the operating lever 3 and the fixing member 1 including the lever shaft 2 and which generates a sound through rotation of the operating lever 3. The sound-generating unit A includes a holder 6 supported not-rotatably to the fixing member 1 with the lever shaft 2 and a sound-generating mechanism which comprises a ridge-groove member 7 having a ridge-groove surface 71 and a sound-generator 8 engageable with the ridge-groove surface 71 to generate a sound, the ridge-groove member 7 and the sound-generator 8 of the sound-generating mechanism being provided at the holder 6. One of the ridge-groove member 7 and the sound-generator 8 of the sound-generating unit A is adapted to engage for associated motion with the operating lever 3 at the boss 3a.

Figure 1:
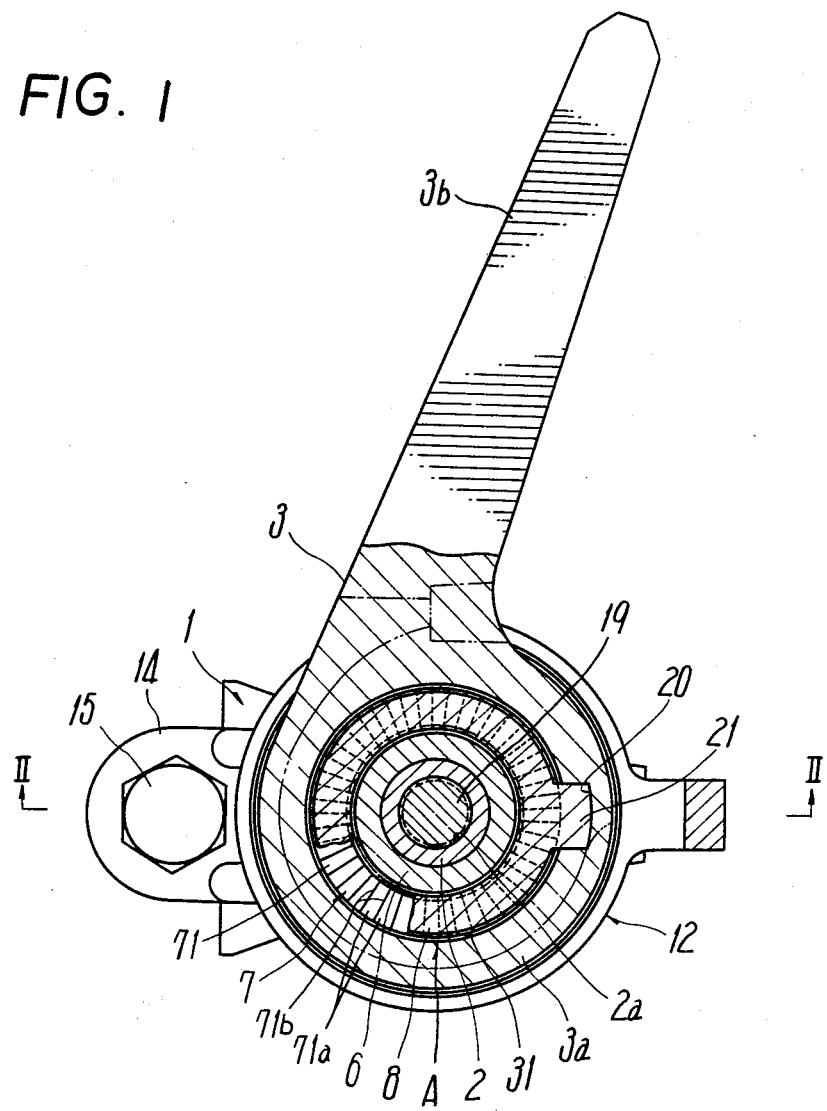
FIG. 1 is a partially cutaway front view of an embodiment of a speed-changing device of the invention.
Figure 3:
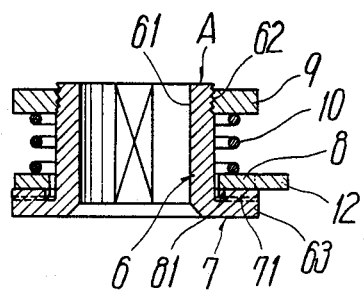
FIG. 3 is a sectional view of a sound-generating unit only.

FIGS. 1 through 3 show the tubular holder 6 which has a fitting bore 61 to be fitted to the lever shaft 2 and is also integrally provided at the outer periphery of one end with the ridge-groove member 7 having the ridge-groove surface 71 which has a number of recesses 71a and protuberances 71b. The holder 6 has screw-threaded portion 62 at outer periphery of the other end, and a nut member 9 is screwed with the screw-threaded portion 62. Between the nut member 9 and the ridge-groove member 7 is provided the sound-generator 8 and a coiled spring 10 for biasing the sound-generator 8 toward the ridge-groove surface 71, thereby forming the sound-generating unit A.

The holder 6 of the sound-generating unit A is fitted at the fitting bore 61 onto the lever shaft 2 at its outer periphery to be supported not-rotatably. At one of the sound-generator 8 and the shaft bore 31 at boss 3a of the lever 3 is provided a recess 20, and at the other one is provided an engaging projection 21 engageable with the recess 20, thereby engaging the sound-generator 8 for associated motion with the boss 3a of the lever 3.

The holder 6 of the sound-generating unit A is formed in a tubular shape; has at one end a flange 63 extending outwardly and at outer periphery of the other end the screw-threaded portion 62; and is detachably supported to the lever shaft 2. The holder 6 has a length to extend upwardly beyond upper edge of the lever shaft 2. The washer 5 is fitted on the upper edge of the holder 6, and the tightening bolt 19 is screwed with the threaded bore 2a of the lever shaft 2 to be tightened, thereby sandwiching and fixing the holder 6 between the base plate 12 and the washer 5. The fitting bore 61 of the holder 6 and the outer peripheral surface of the lever shaft 2 are formed to have a non-circular cross section so as to prevent relative rotation between the holder 6 and lever shaft 2.

The ridge-groove member 7 is formed such that the ridge-groove surface 71 is formed peripherally at the inside surface of the flange 63 at the holder 6. The ridge-groove member may alternatively be formed separately therefrom and fixed thereto by fixing means such as welding, screw-threading etc.

The intervals between the recesses 71a on the ridge-groove surface 71 of ridge-groove member 7 are not specifically defined, but for example may be adapted to be substantially equal to the movement extent of the operating lever 3 corresponding to its rotational magnitudes between the speed-change stages. In this instance, the sound-generator 8 having for example one engaging portion is engaged with one of the recesses 71a so that the operating lever 3 can be stopped at any position corresponding to any of the speed-change stages.

The sound-generator 8 is made of a disc having a through bore for receiving the holder 6, and has peripherally at one surface an engaging portion 81 which has ridges and grooves for ridge-groove surface and is engageable with the ridge-groove surface 71. The sound-generator 8 has at one side on the outer peripheral surface for example the engaging projection 21. The ridge-groove surface 71 is opposite to the engaging portion 81 in a direction parallel to the axis of the lever shaft 2, and alternatively in the radial direction thereof. In this instance, the ridge-groove surface 71 may be arranged at the inner side or outer side with respect to the engaging portion 81 in the radial direction of the lever shaft.

The sound-generating unit A of the speed-changing device constructed as above-mentioned is previously assembled in such a manner that the sound-generator 8 and the coiled spring 10 are first orderly fitted onto the outer periphery of the holder 6, and the nut member 9 is screwed with the screw-threaded portion 62 of the holder 6, thereby forming or building-up the unit. Next, the base plate 12 is fitted at the square bore 12a to the square swollen portion 17 of the fixing member 1 to support the base plate 12 not-rotatably, then the washer 4 is fitted around the lever shaft and the holder 6 of the sound-generating unit A is fitted supported, for example, to the outer periphery of the lever shaft 2. Then, the washer 4 is fitted to the outer periphery of the flange at the holder 6, and the operating lever 3 is fitted at the shaft bore 31 portion to the outer periphery of the sound-generating unit A, so that the engaging projection 21 is engaged with the recess 20. The washer 5 is supported to the end of the holder 6 projecting outwardly of the lever shaft 2, and the lid 13 is put outside the washer 5. The tightening bolt 19 is inserted through the lid 13 and washer 5 and screws with the lever shaft 2 at the threaded bore 2a, thereby sandwiching and fixing the holder 6 between the base plate 12 and the lid 13 and preventing the operating lever 3 from falling off from the device.

The speed-changing device constructed as described above is so adapted that the operating lever 3 is connected, as well-known, to the movable member of a derailleur by means of a control wire, so that the lever 3 is turned to move the movable member to thereby perform speed-changing among a predetermined number of speed-change stages. In this instance, when the operating lever 3 is operated for rotation, the sound-generator 8 in elastic engagement with the recess 71a of the ridge-groove surface 71 of ridge-groove member 7 is moved away therefrom against the biasing force of the coiled spring 10, so that the engaging portion 81 of the sound-generator 8 passes over the protuberance 71b of the ridge-groove member 7, and simultaneously engages elastically with a recess 71a next to that recess 71a of the ridge-groove surface 71 by means of the force of coiled spring 10. When the sound-generator 8 engages with the ridge-groove surface 71 by the spring 10, it generates an engagement sound which is transmitted from the engagement portion between the sound-generator 8 and the ridge-groove surface 71, for example, to the shaft bore 31 of the operating lever 3, thereby making a resonance in the bore 31 to provide an amplified larger sound which is transmitted outwardly of the device.

In the abovesaid embodiment, the holder 6 of the sound-generating unit A is supported to the lever shaft 2 of the fixing member 1. Alternatively, a supporting portion for the holder 6 may be formed separately from the lever shaft 2 and provided at the fixing member 1 to support the holder 6.

Additionally, the sound-generator 8 is biased to the ridge-groove member 7 by means of the coiled spring 10. Alternatively, the spring may be eliminated, and the biasing means may be formed integrally with the sound-generator 8 as shown in the embodiments depicted in FIGS. 4 through 6, or 7.

Figure 4:
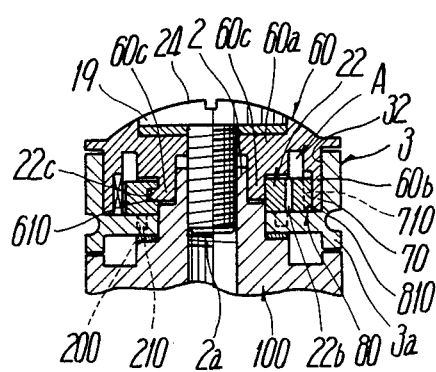
FIGS. 4 through 9 are explanatory views of modified embodiments.
Figure 5:
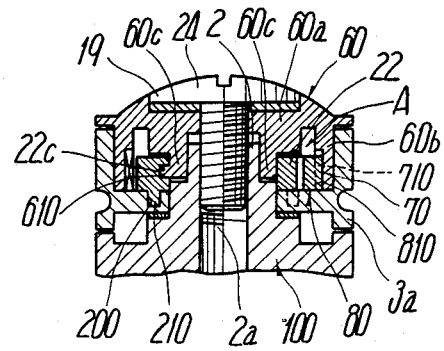
Figure 6:
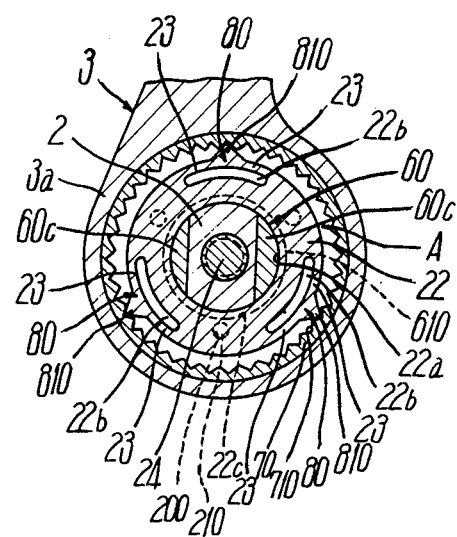

In the FIGS. 4-6 embodiment, a support member 22 made of synthetic resin is provided having a through bore 22a at the center and at the outer peripheral portion a plurality of sound-generators 80 each having one engaging portion 810. Between each sound-generator 80 and the through bore 22a is provided an elongate bore 22b to thereby provide elastically deformable elastic portions 23, 23 between the sound generator 80 and the support member 22. In this instance, the through bore 22a of support member 22 is provided at the inner surface with an annular groove 22c. The holder 60 which is formed integrally with ridge-groove member 70 is provided with an anti-fall off protuberance 610 fitted for engagement into the annular groove 22c for preventing the support member 22 from falling off from the holder 60, i.e., supporting the support member 22 to the holder 60 to thereby form the sound generating unit A. Additionally, at one of the support member 22 and the boss 3a of the operating lever 3 is provided a plurality of recesses 200, and at the other is provided engaging protuberances 210 engageable with the recesses 200, so that the support member 22 is engaged for associated motion with the boss 3a by means of the recesses 200 and the engaging protuberances 210.

The device shown in FIGS. 4-6 employs a fixing member 100 without the washer 5, baseplate 12, and lid 13 shown in the FIGS. 1 through 3 embodiment. The shaft bore 31 of the operating lever 3 is provided with a cavity 32 into which the holder 60 is fitted and supported non-rotatably to the outer periphery of the end of lever shaft 2. The holder 60 comprises a disc-portion 60a having at the center a through bore, a tubular portion 60b axially extending at one side surface of the outer peripheral portion of the disc portions 60a, and a pair of fork-like shaped fitting portion 60c, 60c axially extending at one side surface and around the through bore of the disc portion 60a. The tubular portion 60b is integrally provided with tubular ridge-groove member 70 having at the inner surface a ridge-groove surface 710. Additionally, the sound-generating unit A is mounted to the lever shaft 2 in such manner that a tightening bolt 24 is inserted into the central bore of the holder 60 and screws at the foremost end screw-threaded portion with the lever shaft 2 at its threaded bore.

Figure 7:
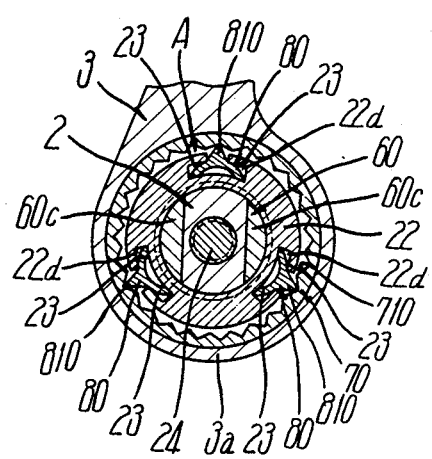

In the FIG. 7 embodiment, the support member 22, the sound-generator 80 having engaging portions 810, and the elastic portions 23, 23 which are shown in FIGS. 4-6 embodiment, are formed separately. The sound generator 80 and elastic portions 23, 23 are made of synthetic resin and are intergrally formed with each other. The support member 22 is provided at the outer peripheral portion with a plurality of holding recesses 22d to which the sound-generator 80 integrally formed with the elastic portions 23, 23 are elastically supported. In the FIG. 7 embodiment, the construction for supporting the supporting member 22 to the holder 60, and the construction of the holder 60 and operating lever 3 are similar to that of the FIGS. 4-6 embodiment.

In the embodiments shown in FIGS. 4-7, the ridge-groove surface 710 is arranged on the outer side with respect to the engaging portion 810 of the sound-generator 80 in the radial direction of the lever shaft 2, but it alternatively may be arranged on the inner side with respect to the engaging portion in the same direction. Additionally, the ridge-groove surface 710 and engaging portion 810 may be opposite to each other in a direction parallel to the axis of the lever shaft 2.

Figure 8:
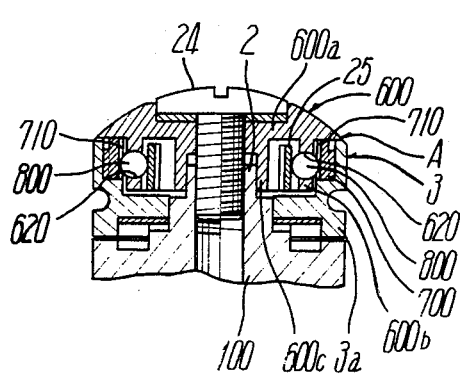
Figure 9:
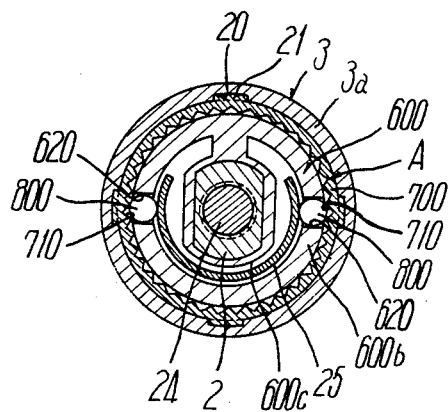

Furthermore, in the abovesaid embodiments, the ridge-groove member 7, 70 are provided at the holder 6, 60 and the sound-generator 8, 80 are adapted to engage for associated motion with the boss 3a of the operating lever 3. These arrangements of the ridge-groove member 7, 70 and sound-generator 8, 80 can be reversed. Namely, in this instance, as shown in FIGS. 8 and 9, a holder 600 is provided comprising a disc portion 600a having a through bore at the center, a tubular portion 600b axially extending at one side surface of outer peripheral portion of the disc portion 600a, and a fitting tubular portion 600c axially extending at one side surface and around the through bore of the disc portion 600a. The tubular portion 600b is provided with holding bore 620 to which a sound-generator 800 comprising a rolling member such as balls etc. is movably held. A ridge-groove member 700 having at an inner surface a ridge-groove surface 710 is fitted at the outer periphery of the tubular portion 600b, and the sound-generator 800 is biased to the ridge-groove surface 710 by an arcuate leaf spring 25 fitted within the tubular portion 600b, thereby forming the sound-generating unit A. At one of the ridge-groove member 700 and the boss 3a of the operating lever 3 is provided a recess 20, and at the other is provided an engaging protuberance 21 engageable with the recess 20, thereby causing the ridge-groove member 700 to engage for associated motion with the boss 3a.

As seen from the above, a invention provides the holder supported non-rotatably to the fixing member including the lever shaft, and a sound-generating mechanism comprising the ridge-groove member having the ridge-groove surface and the sound-generator engageable therewith to generate a sound. The sound-generating mechanism is assembled into the holder so as to form the sound-generating unit.

Additionally, one of the ridge-groove member and the sound-generator of the sound-generating unit is adapted to engage for associated motion with the boss of the operating lever. Hence, the sound-generating unit can be previously assembled without any obstructions by the other components. Furthermore, the sound-generating unit can be accurately and ensurely mounted in proper position by a simple operation in which the holder of the sound-generating unit and the boss of the operating lever are supported to the fixing member including the lever shaft, and the boss of the operating lever is adapted to engage with one of the ridge-groove member and sound-generator of the sound-generating unit. Hence, assembly efficiency as a whole can be facilitated, and production costs reduced.

Furthermore, the sound-generating unit of the invention can be applied in common to any of various types of speed-changing devices having respective different constructions for supporting the operating lever and respective different constructions at the boss thereof, but has an accommodation room for example around the lever shaft for accommodating the sound-generating unit and has at the boss of the operating lever an engaging portion engageable with one of the ridge-groove member and the sound-generator. Hence, even the speed-changing devices of various types can be cheaply manufactured at a reduced cost.

Additionally, when intervals between the recesses at the ridge-groove surface of the ridge-groove member are made for example smaller, the device can provide a sound quickly sounding at short intervals. When intervals between the recesses at the ridge-groove surface are set to be substantially equal to the movement extent of the operating lever corresponding to its rotational magnitudes between the speed-change stages while the sound-generator is adapted to engage with one of the recesses, the construction can be employed as a positioning mechanism for the operating lever to stop the operating lever at any position corresponding to any speed-change stages.

While preferred embodiments of the invention have been shown and described, the invention is not limited to the specific construction thereof, which is merely exemplary in the specification rather than defined.

What is claimed is:

1. A speed-changing device for a bicycle, comprising a fixing member having a lever shaft, an operating lever having a boss supported rotatably relative to said lever shaft, and a sound-generating unit for generating a sound upon rotational operation of said operating lever, said sound-generating unit comprising a holder supported non-rotatably to said fixing member, and a sound-generating mechanism including a ridge-groove member having a ridge-groove surface and a sound-generator engageable with said ridge-groove surface for generating a sound, said ridge-groove member and said sound-generator being disposed within a space defined by said boss, said holder supporting said ridge-groove member and said sound-generator, said ridge-groove member and said sound-generator being held together by a holding and biasing means comprising a holding member projecting outwardly from said holder and a spring disposed between said holding member and said sound generator, one of said ridge-groove member and said sound-generator being engaged with said boss of said operating lever to move in association therewith and the other being held stationary.

2. A speed-changing device for a bicycle according to claim 1, wherein said ridge-groove member of said sound-generating unit is fixed to said holder, and said sound-generator is engaged for associated motion with said boss of said operating lever.

3. A speed-changing device for a bicycle according to claim 1, wherein said sound-generator of said sound-generating unit is supported to said holder, and said ridge-groove member is engaged for associated motion with said boss of said operating lever.

4. A speed-changing device for a bicycle according to claim 1, wherein said sound-generator of said sound-generating unit has a ridge-groove surface engageable with said ridge-groove surface of said ridge-groove member.

5. A speed-changing device for a bicycle according to claim 1, wherein said sound-generator of said sound-generating unit employs a rolling member.

6. A speed-changing device for a bicycle according to claim 1, wherein means for engaging one of said ridge-groove member and said sound-generator of said sound-generating unit for associated motion with said boss of said operating lever comprises a recess and an engaging protuberance engageable with said recess.

7. A speed-changing device for a bicycle according to claim 1, wherein said ridge-groove member of said sound-generating unit has a ridge-groove surface having a plurality of recesses and a plurality of protuberances, and intervals between said recesses are made to be substantially equal to the movement extent of said operating lever corresponding to its rotational magnitudes between predetermined speed-change stages, so that said sound-generator is engaged with one of said recesses to stop and position said operating lever at a position corresponding to one of said speed-change stages.

8. A speed changing device for a bicycle according to claim 1, wherein said holding member comprises a nut screwed to said holder.

* * * * *